(12) United States Patent
Ravagni et al.

(10) Patent No.: US 6,576,182 B1
(45) Date of Patent: Jun. 10, 2003

(54) PROCESS FOR PRODUCING SHRINKAGE-MATCHED CERAMIC COMPOSITES

(75) Inventors: Alberto Ravagni, Saarbrücken-Dudweiler (DE); Rüdiger Nass, Riegelsberg (DE); Helmut Schmidt, Saarbrücken-Güdingen (DE); Bernhard Walter, St. Ingbert (DE)

(73) Assignee: Institut Fuer Neue Materialien gemeinnuetzige GmbH, Saarbruecken (DE)

( * ) Notice: Subject to any disclaimer, the term of this patent is extended or adjusted under 35 U.S.C. 154(b) by 0 days.

(21) Appl. No.: 08/930,241

(22) PCT Filed: Mar. 29, 1996

(86) PCT No.: PCT/EP96/01401

§ 371 (c)(1),
(2), (4) Date: Sep. 30, 1997

(87) PCT Pub. No.: WO96/30207

PCT Pub. Date: Oct. 3, 1996

(30) Foreign Application Priority Data

Mar. 31, 1995 (DE) .......................... 195 12 146

(51) Int. Cl.$^7$ ................................ B32B 18/00
(52) U.S. Cl. ................ 264/628; 264/113; 264/DIG. 48; 210/490; 210/500.25; 210/500.26
(58) Field of Search ................ 210/490, 500.26, 210/500.25; 55/523; 264/43, 45.1, 46.4, 46.6, 672, 628, DIG. 48, 113; 419/5, 6, 7, 8, 9; 428/699, 701; 156/89.11

(56) References Cited

U.S. PATENT DOCUMENTS

| | | | | |
|---|---|---|---|---|
| 3,158,532 A | * | 11/1964 | Pall | 210/505 |
| 4,957,673 A | * | 9/1990 | Schroeder et al. | 264/643 |
| 5,455,000 A | * | 10/1995 | Seyferth et al. | 419/36 |
| 5,590,387 A | * | 12/1996 | Schmidt et al. | 419/36 |
| 5,593,781 A | * | 1/1997 | Nass et al. | 428/403 |
| 5,628,848 A | * | 5/1997 | Friese et al. | 156/89 |
| 5,656,168 A | * | 8/1997 | Millares | 210/490 |
| 5,677,072 A | * | 10/1997 | Chatterjee et al. | |

FOREIGN PATENT DOCUMENTS

| | | | |
|---|---|---|---|
| JP | 01245818 | * | 10/1989 |
| WO | 93/21127 | * | 10/1993 |

* cited by examiner

*Primary Examiner*—W. L. Walker
*Assistant Examiner*—David Sorkin
(74) *Attorney, Agent, or Firm*—Oblon, Spivak, McClelland, Maier & Neustadt, P.C.

(57) ABSTRACT

A process for producing a composite, containing at least one shrinkage-matched ceramic layer, wherein a starting material for the ceramic layer(s) has shrinkage behavior on sintering which is matched to remaining layer(s), and which is selected such that the ceramic-forming constituent of the same contains at least one ceramic powder of a specific size, and which process entails joining the layers of the composite by sintering.

19 Claims, No Drawings

PROCESS FOR PRODUCING SHRINKAGE-MATCHED CERAMIC COMPOSITES

BACKGROUND OF THE INVENTION

FIELD OF THE INVENTION

The present invention relates to a process for producing shrinkage-matched composites which comprise at least one ceramic component and the composites obtainable by this process.

DESCRIPTION OF THE BACKGROUND

The production of materials-based components frequently includes the problem of combining various materials (e.g. ceramic and metal or ceramic I and ceramic II) with one another to form one unit. If such composites are produced by powder-metallurgical methods, there is frequently the additional requirement of first pairing unlike materials in the unfired state in order to then sinter them together in a co-firing to produce the actual product.

However, the production of unlike material pairings via sintering processes presents the fundamental problem that each component has specific material properties such as modulus of elasticity, coefficient of thermal expansion and material transport properties (sinter activity). The differences in the sinter activity lead to different shrinkages during the sintering process, so that distortion or complete destruction of the component can occur already during the densification phase. Furthermore, intact components frequently have very high residual stresses which are attributable, on the one hand, to the different shrinkages on sintering and, on the other hand, to the differences in the coefficients of thermal expansion of the materials involved. There have therefore been many attempts to master the problems of the different shrinkages on sintering and different coefficients of thermal expansion by materials-related measures. Among the most widely employed techniques is the use of low-temperature-sintering glass phases by means of which, in combination with appropriate starting powders, sintering temperature and shrinkage on sintering are adjusted. However, for many applications glass phases cannot be used since they adversely affect the material properties of one or more components or the required properties are not achieved at all in the system. In these cases, attempts are made to realize the different material pairings by means of the grain size dependence of the sinter activity of powders. This method of matching the shrinkage on sintering can be employed for many material combinations, but it is associated with considerable technical complication and financial cost. In complicated processes, the grain size distributions of the components have to be matched to one another or powders of appropriate fineness have to be produced first. All techniques have in common the fact that not only selected raw materials but also organic additives are required. These additives, on the one hand, are to disperse the powders homogeneously and in a deagglomerated state in a dispersion medium. On the other hand, they assume the function of processing aids by means of which the rheological properties or the processability of the ceramic compositions are matched to the requirements of the respective shaping process. Depending on the shaping process, the proportion of organics can be up to 50% by volume and has to be removed before sintering, sometimes by complicated and time-consuming processes. This step becomes particularly difficult when different materials such as ceramic/metal are joined to form one part, since the removal of the organic processing aids then has to be additionally carried out under inert conditions. In order to overcome these difficulties and limitations, it would be extremely worthwhile to develop techniques, processes or materials which permit very substantial matching of the shrinkages on sintering when using unlike materials and at the same time make do without addition of organic processing aids or make do with greatly reduced proportions of these. In the ideal case, the function of the organic processing aids should be taken over by inorganic materials which are converted into the ceramic material during sintering.

SUMMARY OF THE INVENTION

It is therefore an object of the present invention to provide a process for producing composites which comprise at least one ceramic component, which process enables the shrinkage behaviour of this or these ceramic component(s) on sintering to be matched to that of the other ceramic and/or non-ceramic components.

It has surprisingly been found that this object is achieved by using nanosize ceramic powder as starting material (or a constituent thereof) for the ceramic component(s) whose shrinkage behaviour on sintering is to be matched to the other component(s). This process provides completely new possibilities in pairing materials and optionally in densifying them in a co-firing.

The present invention accordingly provides a process for producing composites which comprise at least one shrinkage-matched ceramic component, which process is characterized in that the starting material for the ceramic component(s) whose shrinkage behaviour on sintering is to be matched to the remaining component(s) is selected such that the ceramic-forming constituent of the same consists essentially of:

(a) at least one ceramic powder (i) comprising particles having a size of up to 500 nm;

(b) at least one ceramic powder (i) as defined in (a) in admixture with at least one powder (ii) comprising at least one sintering-inhibiting substance having a particle size equal to or smaller than that of the powder (i); or (c) at least one ceramic powder (i) as defined in (a) in admixture with at least one ceramic powder (iii) having a particle size above that of the powder (i) used and up to 500 $\mu$m.

DETAILED DESCRIPTION OF THE INVENTION

The ceramic powder (i) preferably comprises particles having a size of up to 300 nm and in particular up to 200 nm. Although there is no critical lower limit for the particle size, for reasons of being able to make the powder it is usually about 1 nm. Furthermore, the ceramic powder (i), like the other ceramic powders used, can be used in pretreated form; this pretreatment can include, in particular, a surface modification of the powder particles with short-chain (preferably bifunctional) organic or organometallic compounds, as described, for example, in DE-A-4212633. The purpose of this pretreatment can be, for example, to adjust the rheology of the mix and/or (particularly in the case of nanosize powders) the solids content.

The particles of the ceramic powders used in the present invention can have various shapes, for example spherical, tabular, fibre-shaped, etc. The term particle size as used herein refers in each case to the longest dimension of these particles, which corresponds, for example, to the diameter in the case of spherical particles. Furthermore, for example, agglomerates can first be produced from these powders and then be subjected to thermal post-treatment in order to adjust the sinter activity.

The ceramic materials used in the present invention are preferably derived from metal (mixed) oxides and carbides, nitrides, borides, silicides and carbonitrides of metals and nonmetals. Examples are (optionally hydrated) $Al_2O_3$, partially and fully stabilized $ZrO_2$, mullite, cordierite, perovskites, spinels, e.g. $BaTiO_3$, PZT, PLZT, etc., and also SiC, $Si_3N_4$, $B_4C$, BN, $MoSi_2$, $TiB_2$, TiN, TiC and Ti(C,N). Of course, it is also possible to use mixtures of oxides or mixtures of non-oxides and mixtures of oxides and non-oxides. Particularly preferred ceramic starting materials are ($\alpha$- or $\gamma$-)$Al_2O_3$ and $ZrO_2$ (in unstabilized, partially stabilized or fully stabilized form).

The above alternative (b) of the process of the invention is of particular interest when composites are to be produced from a (ceramic) powder which sinters relatively sluggishly and a powder (i) (e.g. in the production of filters). In this case, the shrinkage behaviour of the (very sinter active) powder (i) has to be matched to that of the coarser powder. Sintering-inhibiting secondary phases in the form of the powder (ii) are used for this purpose. The particular materials used as powder (ii) depend on the nature of the powder (i). For $\alpha$-$Al_2O_3$ as powder (i), the powder (ii) used can be, for example, SiC, mullite or $ZrO_2$. In this way, it is possible, for example, to sinter a thin $Al_2O_3$/SiC layer onto a porous $Al_2O_3$ substrate, i.e. coarse $Al_2O_3$ having a very low sinter activity, in a co-firing and to produce defined pores whose size depends on the size of the particles in the powder (i) in the $Al_2O_3$/SiC layer. This is not possible using known techniques.

The powder (ii) has to have a particle size less than or equal to that of the powder (i) used in combination. Furthermore, the powder (ii) is preferably a ceramic powder. The weight ratio of powder (i) to powder (ii) (and in the case of the alternative (c), to powder (iii)) is not critical and depends on the circumstances of the individual case.

The powder (iii) used according to the invention can be, for example, a commercially available sinterable powder or an agglomerated (granular) material derived therefrom. It can, however, also be an agglomerated material derived from a powder (i).

The one or possibly more remaining component(s) of the composite to be produced according to the invention can be selected from among various materials which can be processed in combination with a ceramic material to give a useable composite and can withstand a sintering process. Further components which are preferred according to the invention are selected from among ceramic and/or metallic materials and/or glass. Particularly preferably, at least one further component consists of ceramic material, preferably a material whose starting components are selected from the above ceramic powder (iii), e.g. a ceramic powder (iv), in which primary particles having a size of up to 500 nm, preferably up to 300 nm, are present in the form of agglomerates. Furthermore, it is of course also possible for the composite to be produced according to the invention to include a plurality of components derived from the alternatives (a), (b) and (c).

According to the invention, it is particularly preferred that the chemical composition of all powders (i), (iii) and (iv) used for producing a composite is identical.

The above ceramic powders (iv) having agglomerated primary particles can be produced from the corresponding powders (i) by conventional methods. Concrete examples of such methods are indicated below in the Examples.

The composites comprising at least one shrinkage-matched ceramic component obtainable according to the invention can be produced by means of any process which is suitable for producing a particular composite of the envisaged type. Examples of such processes are pressing, electrophoresis, gel casting, rolling, slip casting, injection moulding, tape casting, pressure casting and lamination. Such processes are well known to those skilled in the art. The processing of the ceramic starting material to give the finished ceramic is also carried out in a customary way. Examples of processing methods are likewise indicated in the Examples.

The process of the invention makes it possible to obtain, for example, (multi-layer) gradient materials in which a porous support is provided with a dense layer or a support having coarse porosity is provided with a layer having fine porosity, it being possible to adjust the pore size and porosity also by means of the sintering process. Of course, multilayer structures in which each layer is dense can also be produced according to the invention. The same applies to multilayer structures in which, for example, porous and dense layers alternate, it being possible for the layers to consist of identical or different materials. The invention enables, for example, composites (consisting exclusively of ceramic material) in the green state to be sintered in a co-firing or green and sintered parts to be joined by sintering.

Composites which are particularly preferred according to the invention are multilayer (e.g. two-layer) structures composed of ceramic sheets, in particular filters or filter components. Another preferred embodiment comprises composites of ceramic sheets and metals.

The process of the invention has various advantages. In particular, alternative (a) enables, in comparison with processes which use powders having significantly larger particle sizes, significantly higher sinter activities (i.e. significantly lower sintering temperatures) to be achieved. At the same time, completely new material combinations, e.g. in the field of ceramic/metal, which can be densified by means of a co-firing are also possible. A further important aspect is that advantages are obtained in the sequential build-up of, for example, multilayer structures. Thus, new material combinations and structural designs on sintered substrates can be realized. Likewise, it is possible to seal or even out surface flaws by means of thin layers of ceramic.

The advantages of the alternative (b) have already been briefly discussed above.

According to the alternative (c), variation of the proportions by mass of powder (i) and powder (iii) enables the shrinkage behaviour to be conveniently matched. Of particular interest are the opportunities given by the use of a powder (iii) which has been produced from the powder (i) by agglomeration (powder (iv)) together with a pure powder (i). This may be briefly illustrated for a two-layer structure:

A sheet A is first produced from the powders (i) and (iv). A second sheet B produced from the powder (i) is cast or laminated onto the sheet A. In a co-firing, the two sheets can be sintered to one another to give a stress-free composite. Depending on the composition of sheet A and the sintering conditions employed, dense materials, materials having a dense layer (sheet B) and porous support (sheet A) or porous layer (sheet B) and porous support (sheet A) can be obtained. This is not possible using known techniques.

The present invention is illustrated below by means of non-limiting examples.

EXAMPLE 1

In this example, two sheets, A and B, are produced, laminated to one another and sintered in a co-firing. Sheet A comprises agglomerated zirconium oxide powder (i) (i.e. powder (iv)); sheet B comprises dispersed powder (i) of the same type. The use of a single type of powder ensures the same shrinkage behaviour for the two sheets. Furthermore, there are no differences in the coefficient of thermal expansion.

Production of Sheet A 200 g of cubic $ZrO_2$ (particle size 10 nm, 9 mol % of $Y_2O_3$) are dispersed in 800 g of water. Agglomerates present are destroyed by ultrasonic treatment. The suspension is then poured into plaster moulds to produce a green body.

After drying, the resulting green body is calcined at 800° C. for 30 minutes. The calcined material is comminuted in a ball mill and fractions having different particle diameters in the range 10–500 μm are separated out by sieving.

As an alternative, the agglomerated powder is produced as follows:

200 g of cubic $ZrO_2$ (see above) are dispersed in 800 ml of an aqueous solution containing 20 g of PVA (polyvinyl alcohol, Mowiol® 26–88 from Hoechst). Agglomerates present are destroyed by ultrasonic treatment. 0.2 g of glutaric dialdehyde are then added as crosslinker and the pH of the resulting mixture is adjusted to 2 by addition of $HNO_3$.

The suspension is poured into plaster moulds to produce a green body. The resulting green body is, after drying, comminuted in a ball mill and fractions having different particle diameters in the range 10–500 μm are separated out by sieving.

100 g of the agglomerated powder are added to an aqueous binder solution (containing 10% of PVA Mowiol® 26–88). This leads to a ceramic slip having a solids content of 40% by weight. The powder/binder ratio is set to 5:1. After homogenizing and degassing, the resulting slip is used to produce ceramic sheets having a thickness of 1 mm by tape casting.

Production of the Sheet B

The sheet B comprises dispersed $ZrO_2$ particles in an organic binder system. It is produced by first dispersing 10 g of cubic $ZrO_2$ (particle size 10 nm, 9 mol % of $Y_2O_3$) in 90 g of water. 85 g of the resulting sol are subsequently admixed with 15 g of an aqueous binder solution and the mixture is homogenized for 2 hours. The binder solution is an aqueous solution containing 10% by weight of a commercial binder in granular form (PVA Mowiol® 30–92; Hoechst AG) and 2% by weight of polyethylene glycol (molecular weight 200; Merck). The sol/binder mixture is subsequently processed by tape casting and subsequent drying to give a 5 μm layer.

The thin sheet B and the substrate sheet A are subsequently laminated. The green body thus obtained is sintered at 1150° C. for 2 hours. The linear shrinkage of both sheets is 40%. The result is a dense $ZrO_2$ layer having a thickness of 3 μm on a porous support of $ZrO_2$ having a thickness of 1 mm.

EXAMPLE 2

In this example, a sandwich structure consisting of 6 layers is produced. The layers consist alternately of the sheets A and B as described in Example 1.

Three unsintered, green bilayer structures from Example 1 are laminated to one another. This is followed by co-firing of the structure in a similar way to Example 1.

EXAMPLE 3

In this example, a bilayer structure is produced by tape casting a sheet B over a sheet A. The structure is sintered by co-firing. Sheet A is produced from a fine α-alumina powder and contains α-SiC as sintering inhibitor. The sheet B comprises a powder mixture of coarse and fine α-alumina particles.

Production of the Sheet A

Two suspensions each having a solids content of 40% by weight are produced from fractionated α-$Al_2O_3$ (CS400m Martinswerk, particle size 200 nm) powder (suspension A) and SiC (ESK, particle size 200 nm) powder (suspension B) respectively. The pH of suspension A is adjusted to 4 by addition of $HNO_3$, while the pH of suspension B is adjusted to 9 by addition of TMAH (tetramethylammonium hydroxide).

The suspension B is added to the suspension A until an SiC content of 15% by weight, based on $Al_2O_3$, is reached.

A binder solution of PVA (Mowiol® 26–88, 20% by weight in water) is added to the mixed suspension. The weight ratio of powder/binder is 5/1. After homogenizing and degassing the suspension, ceramic sheets having a thickness of 100 μm are produced by tape casting of the slip.

Production of the Sheet B

The slip for the sheet B comprises two types of particles. Firstly, an aqueous slip comprising 20% by weight of α-alumina powder having a particle size of 400 nm (CS400 Martinswerk) and 40% by weight of α-alumina powder having a particle size of 10 μm (Amperit®, HC Starck) is made up. Subsequently, 95 g of the slip together with 5 g of a 25% by weight aqueous PVA solution (Mowiol® 4–86) are homogenized for 2 hours.

The slip is subsequently tapecast over the above sheet A and dried. The thickness of the above sheet B is 3 mm.

The production of the bilayer structure is concluded by co-firing the structure at 1500° C. for 2 hours. The linear shrinkage of the sheet A is 5%, that of the sheet B is 4%.

EXAMPLE 4

Example 3 is repeated with the sole exception that mullite (particle size 200 nm) is used as sintering inhibitor in place of SiC.

The linear shrinkage of the sheet A is 5%, that of the sheet B is 4%.

EXAMPLE 5

Example 3 is repeated with the sole exception that $ZrO_2$ (Degussa, particle size 50 nm) is used as sintering inhibitor in place of SiC.

The linear shrinkage of the sheet A is 5%, that of the sheet B is 4%.

EXAMPLE 6

In this example a bilayer structure is produced. For this purpose, the sheet A is cast over the sheet B and co-fired therewith. The sheet A consists of agglomerated α-alumina powder; the sheet B consists of dispersed powder of the same type. The use of a single type of powder ensures the same shrinkage behaviour for the two sheets.

Furthermore, there are no differences in the coefficient of thermal expansion.

Production of Sheet A 500 g of γ-$Al_2O_3$ (particle size 40–50 nm, 0.1% by weight of MgO) are dispersed in 500 g of water. Agglomerates present are destroyed by ultrasonic treatment and the suspension is stabilized by means of an organic dispersant (polyacrylic acid, 1% by weight based on the powder). The suspension is then poured into plaster moulds to produce a green body.

After drying, the green body is calcined at 1000° C. for 30 minutes. The calcined material is comminuted in a ball mill and fractions having different particle diameters in the range 10–500 μm are separated out by sieving.

As an alternative, the powder can be produced as follows:

500 g of γ-$Al_2O_3$ (see above) are dispersed in 500 g of an aqueous solution containing 50 g of PVA (Mowiol® 26–88). Agglomerates present are destroyed by ultrasonic treatment and 5 g of glutaric dialdehyde are then added as crosslinker, after which the pH is adjusted to 2 by addition of $HNO_3$.

The resulting suspension is poured into plaster moulds to produce a green body. After drying, the resulting green body is comminuted in a ball mill and fractions having different particle diameters in the range 10–500 μm are separated out by sieving.

100 g of the agglomerated powder are added to an aqueous binder solution (containing 10% by weight of PVA Mowiol® 26–88). This leads to a ceramic slip having a solids content of 40% by weight. The powder/binder ratio is set to 5:1. After homogenizing and degassing, the resulting slip is used to produce ceramic sheets having a thickness of 1 mm by tape casting.

Production of the Sheet B

To produce the sheet B, 80% by weight of γ-$Al_2O_3$ (particle size 40–50 nm, are first dispersed in water). The suspension is subsequently homogenized by means of an aqueous PVA solution (MoWiol® 4–86). The solids content based on α-alumina is reduced to 60% by weight in this step. The PVA solution contains 25% by weight of binder in granulated form.

The slip is subsequently processed by tape casting and drying to give a layer having a thickness of 20 μm.

The thin sheet B is then laminated to the substrate sheet A and the green body thus obtained is sintered at 1550° C. for 2 hours. The linear shrinkage of both sheets is 30%. The result is a dense $Al_2O_3$ layer having a thickness of 14 μm on a porous support having a thickness of 1 mm.

What is claimed is:

1. A process for producing a cofired shrinkage-matched composite, said composite comprising at least first and second cofired layers, the process comprising:
    joining the first and second layers of said composite by cofiring and sintering;
    wherein said first layer is a ceramic layer having a first porosity,
    said second layer is in contact with said ceramic layer, and
    said second layer has a second porosity which is different than said first porosity;
    wherein said first and said second porosities are obtained by said cofiring and sintering;
    wherein a first starting material for said ceramic layer has a first shrinkage behavior on sintering, and a second starting material for said second layer has a second shrinkage behavior on sintering, and wherein said first and second shrinkage behaviors are matched such that a difference in linear shrinkage between said first and second layers is from 0 to 1%,
    and wherein the ceramic layer comprises the following compositions (a) or (b):
    (a) at least one ceramic powder (i) comprising individual particles having a size of up to 500 nm, and a ceramic powder (iv) in which primary particles having a size of up to 500 nm are present in the form of agglomerates and wherein the chemical composition of the powders (i) and (iv) is the same; or
    (b) at least one ceramic powder (i) as defined in (a) in admixture with at least one powder (ii) comprising at least one sintering-inhibiting substance having a particle size equal to or smaller than that of the powder (i);
    and wherein said second layer is a ceramic or non-ceramic layer.

2. The process of claim 1, wherein said second layer is a metal layer.

3. The process of claim 1, wherein the second starting material is selected from the group consisting of ceramic materials, metallic materials, and glass.

4. The process of claim 3, wherein the ceramic powders (i) and (iv) are each independently selected from the group consisting of metal oxides, mixed metal oxides, carbides, nitrides, borides, suicides or carbonitrides of metals and nonmetals and a combination thereof.

5. The method according to claim 4, wherein said metal oxide is selected from the group consisting of $Al_2O_3$, $ZrO_2$, mullite, cordierite, perovskites, and $BaTiO_3$.

6. The process of claim 1, wherein in a), the particle size of the ceramic powder (i) is up to 300 nm.

7. The process of claim 6, wherein in a), the particle size of the ceramic powder (i) is up to 200 nm.

8. The process of claim 1, wherein at least one of the ceramic powders is surface-modified with organic or organometallic compounds.

9. The process of claim 1, wherein at least one of the ceramic powders is first converted into an agglomerate which is then heat treated in order to set the sinter activity.

10. The process of claim 1, wherein the composite has a multilayer structure composed of ceramic sheets.

11. The process of claim 10, wherein the composite is a gradient material.

12. The process of claim 10, wherein the composite includes a metal component.

13. The process of claim 11, wherein the ceramic powder (i) comprises α- or γ-$Al_2O_3$ or $ZrO_2$.

14. A composite obtained by the process of claim 1.

15. A filter or filter component, comprising the composite of claim 1.

16. The process of claim 1, wherein said difference in linear shrinkage is 0%.

17. The method according to claim 1, wherein said ceramic layer consists essentially of (a).

18. The method according to claim 1, wherein said ceramic layer consists essentially of (b).

19. The method according to claim 1, wherein said difference in linear shrinkage is 1%.

* * * * *

UNITED STATES PATENT AND TRADEMARK OFFICE
CERTIFICATE OF CORRECTION

PATENT NO. : 6,576,182 B1 Page 1 of 1
DATED : June 10, 2003
INVENTOR(S) : Ravagni et al.

It is certified that error appears in the above-identified patent and that said Letters Patent is hereby corrected as shown below:

<u>Title page,</u>
Item [75], Inventor, should read:
-- [75] Inventors: Alberto Ravagni, Saarbrücken-Dudweiler (DE);
Rüdiger Nass, Weiherstrasse 7 66292 Riegelsberg (DE); Helmut Schmidt, Saarbrücken-Güdingen (DE);
Bernhard Walter, St. Ingbert (DE) --

Item [73], Assignee, should read:
-- [73] Assignee: Ruediger Nass, Riegelsberg (DE) --

Item [45] and the Notice information should read as follows:

-- [45] Date of Patent: *Jun. 10, 2003

[*] Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Seventeenth Day of February, 2004

JON W. DUDAS
*Acting Director of the United States Patent and Trademark Office*